E. LETORD.
BRACKET SEAT FOR PASSENGERS ON AERIAL NAVIGATION APPARATUS.
APPLICATION FILED JAN. 19, 1918.

1,303,076.

Patented May 6, 1919.

Witnesses
Jean Ternain
Gaston Gay

Inventor
Emile Letord

UNITED STATES PATENT OFFICE.

EMILE LETORD, OF SEINE-ET-OISE, FRANCE.

BRACKET-SEAT FOR PASSENGERS ON AERIAL-NAVIGATION APPARATUS.

1,303,076.  Specification of Letters Patent.  Patented May 6, 1919.

Application filed January 19, 1918. Serial No. 212,792.

*To all whom it may concern:*

Be it known that I, EMILE LETORD, a citizen of the French Republic, residing at Seine-et-Oise, in France, have invented certain new and useful Improvements in Bracket-Seats for Passengers on Aerial-Navigation Apparatus, of which the following is a specification.

In aerial navigation apparatus, especially in the battle aeroplanes carrying a passenger or passengers, it is important that each passenger, according to his duties may be able to turn around easily in the necessarily restricted space which is reserved to him.

The present invention comprises a bracket seat capable of being raised when required in order to give the passenger when required the whole use of the space which he occupies to allow greater liberty of movement.

The annexed drawing illustrates a form of construction of bracket seat formed for this purpose.

Figure 1:
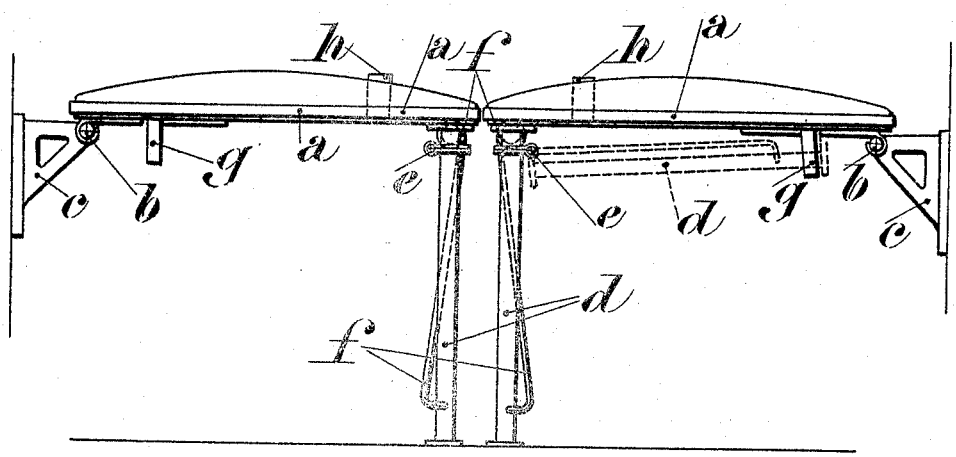
Figure 1 is a front view.
Figure 3:
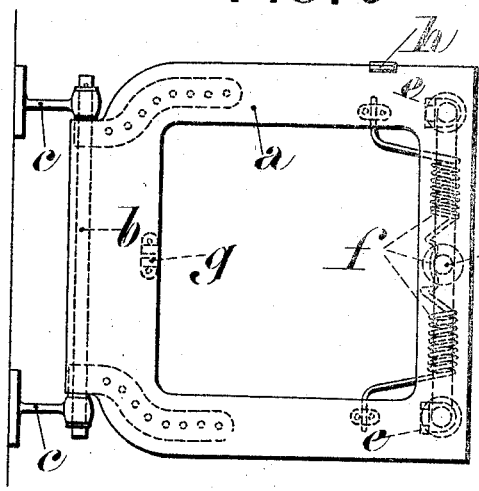
Fig. 3 is a plan view of one half of this bracket seat in which the covering is supposed to be removed.
Figure 2:
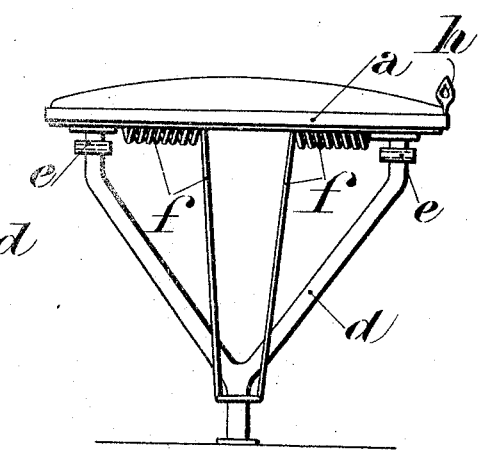
Fig. 2 is a side view.

The seat is composed of two similar bracket seats symmetrically arranged. Each of them consists of a frame $a$, suitably upholstered and articulated by an axle $b$ on two supports $c$ fixed firmly to the aeroplane body. Under the opposite edge is arranged a leg $d$ resting on the ground. This leg is articulated on axles $e$ so as to be able to be turned back against the lower surface of the bracket seat, as indicated in dotted lines on the right of Fig. 1. A spring $f$ keeps the leg normally away from the bracket seat and thus assures the stability of the seat.

For lifting the bracket seat the passenger first raises the leg at the bottom and engages it in a spring catch $g$ provided for this purpose; then he turns up the two bracket seats which remain held in that position by fingers $h$ engaging the spring catches provided for that purpose. The space occupied by the seats is thus completely freed and the passenger can turn around freely.

To turn down the bracket seats the passenger pulls the legs from the spring catches and the legs are automatically restored to their normal position by the springs $f$, then the bracket seats are lowered and the seat is again in position.

What I claim as my invention and desire to secure by Letters Patent of the United States is:—

A folding seat for aerial navigation apparatus, comprising in combination a pair of brackets, a horizontal shaft supported by said brackets, a seat, hinges connecting one side of said seat to said shaft, a catch on the underside of said seat, a forked leg, hinges connecting the upper ends of the forked leg to the underside of said seat opposite to and remote from said shaft, and a spring connected to said seat and bearing against the base of said forked leg.

In witness whereof I have signed this specification in the presence of two witnesses.

EMILE LETORD.

Witnesses:
JEAN GERMAIN,
MARIN VACHON.

Copies of this patent may be obtained for five cents each, by addressing the "Commissioner of Patents, Washington, D. C."